United States Patent [19]

Kase et al.

[11] Patent Number: 5,017,655
[45] Date of Patent: May 21, 1991

[54] URETHANE COATING RESIN COMPOSITION

[75] Inventors: Mitsuo Kase, Chiba; Noboru Okoshi, Sodegaura; Kazue Tsuyuzaki, Chiba, all of Japan

[73] Assignee: Dainippon Ink and Chemicals, Inc., Tokyo, Japan

[21] Appl. No.: 259,915

[22] Filed: Oct. 19, 1988

[30] Foreign Application Priority Data

Oct. 19, 1987 [JP] Japan ................ 62-261644

[51] Int. Cl.$^5$ ............................................ C08G 18/02
[52] U.S. Cl. ..................................... 525/127; 525/128
[58] Field of Search ............................. 525/127, 128

[56] References Cited

U.S. PATENT DOCUMENTS

| 4,503,175 | 3/1985 | Houze et al. |
|---|---|---|
| 4,560,494 | 12/1985 | Druetzlev ............... 525/127 |
| 4,582,888 | 4/1986 | Kase et al. |
| 4,647,623 | 3/1987 | Kase et al. ............... 525/127 |

FOREIGN PATENT DOCUMENTS 0219131 4/1987 European Pat. Off. .
2203159A 10/1988 United Kingdom .

Primary Examiner—Bernard Lipman
Attorney, Agent, or Firm—Sherman and Shalloway

[57] ABSTRACT

An urethane coating resin composition comprising as essential components (A) an isocyanurate-type polyisocyanate derived from hexamethylene diisocyanate and containing at least 65% by weight of a mononuclear compound and (B) an acrylic polyol having a number-average molecular weight of 5,000 to 25,000 and a hydroxyl value of 40 to 160.

12 Claims, No Drawings

URETHANE COATING RESIN COMPOSITION

This invention relates to a novel useful urethane coating resin composition. More specifically, it relates to an urethane coating resin composition comprising a specific isocyanurate-type polyisocyanate and a specific acrylic polyol as essential components and having good weatherability in particular and other excellent properties, which composition can widely be utilized in the field of coatings for automobiles, buildings, building materials, electric appliances and bridges.

Two-package non-yellowing urethane coatings comprising polyisocyanates as a curing agent and acrylic polyols as a main agent (a so-called film-forming agent) are known to be quite useful industrial materials because they provide highly durable coated films excellent in weatherability, mechanical properties and chemical resistance.

In these two-package non-yellowing urethane coatings, there are various polyisocyanates used as a curing agent. Examples thereof are an adduct-type polyisocyanate obtained by the reaction between trimethylolpropane and hexamethylene diisocyanate, a biuret-type polyisocyanate obtained from a biuret forming agent such as water and hexamethylene diisocyanate, and an isocyanurate-type polyisocyanate mixture represented by formula,

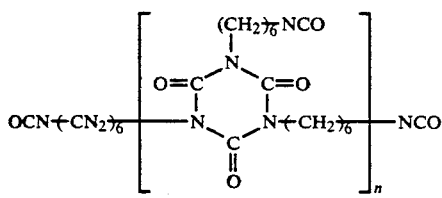

wherein n is an integer of 1 to 20, said mixture being obtained by the isocyanuration reaction of hexamethylene diisocyanate, provided it contains less than 60% by weight, especially 20 to 55% by weight of a compound of formula [I] wherein the number (n) of recurring units is 1, i.e. a "mononuclear" compound. Of these compounds, the isocyanurate-type mixture has an isocyanurate ring of a hard, symmetrical structure having high chemical stability. Accordingly, when said mixture is used in combination with an acrylic polyol, it is expected to obtain an urethane coating with good dry characteristics and excellent durability, which can finish coating for a short period of time.

However, there is a practically serious defect that since such isocyanurate-type polyisocyanate mixture is poor in compatibility with an acrylic polyol which is the most basic property when it is used as a two-package coating, the urethane coating comprising a combination of the isocyanurate-type polyisocyanate mixture and the acrylic polyol cannot exhibit excellent properties inherent in the isocyanurate-type polyisocyanate as such, impairing performance of the coated film.

A method to eliminate the serious defect of the isocyanurate-type polyisocyanate has been already proposed. For example, U.S. Pat. No. 4,582,888 discloses that the isocyanurate-type polyisocyanate is modified with a bulky alkylene diol. U.S. Pat. No. 4,647,623 discloses that the isocyanurate-type polyisocyanate is modified with a cycloalkylene diol. Such diol-modified isocyanurate-type polyisocyanate in combination with the acrylic polyol can give a quick-drying two-package urethane coating having excellent performance and free from yellowing. Compared to the unmodified isocyanurate-type polyisocyanate of formula [I], however, such diol-modified isocyanurate-type polyisocyanate has a low content of isocyanate groups. Consequently, in the formulation of the urethane coating, the amount of the costly diol-modified product has to increase, which is economically disadvantageous. From the aspect of high solid coatings, the diol-modified product has many problems to be improved.

It is an object of this invention to solve a variety of the above problems in the prior art.

To meet the above object, this invention provides an urethane coating resin composition comprising (A) an isocyanurate-type polyisocyanate derived from hexamethylene diisocyanate and containing at least 65% by weight of a mononuclear compound and (B) an acrylic polyol having a number-average molecular weight of 5,000 to 25,000 and a hydroxyl value of 40 to 160.

The composition of this invention is thus characterized in that the specific isocyanurate-type polyisocyanate (A) (i.e. an isocyanurate ring-containing polyisocyanate) derived from hexamethylene diisocyanate and containing at least 65% by weight of the compound of formula [I] wherein the number (n) of recurring units is 1, i.e. the "mononuclear" compound is used as one essential component.

The specific isocyanurate-type polyisocyanate (A) can easily be prepared from hexamethylene diisocyanate in the presence of a catalyst for isocyanuration upon controlling a conversion ratio of the isocyanuration reaction.

The catalyst for isocyanuration used at that time is preferably a compound containing a strongly cationic atom (atomic group) having low electron density. Typical examples thereof are N,N,N-trimethyl-N-2-hydroxypropylammonium-p-tert-butyl benzoate of formula [II],

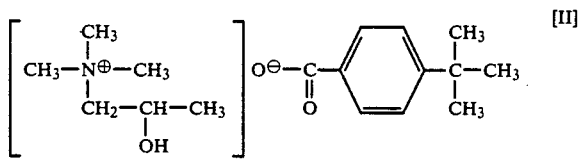

sodium ethylate and sodium propionate. Among these compounds, the compound of formula [II] is suited for preparation of a polyisocyanate because of easy purification.

The catalyst for isocyanuration is however not limited in particular to the compound of formula [II] alone; any compound will do if having an effective catalytic activity for isocyanuration.

Said catalyst is ordinarily used in the form of a dilute solution by an organic solvent and in an amount of 10 to 1000 ppm, preferably 20 to 500 ppm based on the diisocyanate compound.

In preparing the isocyanurate-type polyisocyanate (A), the isocyanuration reaction is usually carried out at 30° to 120° C., preferably 40° to 100° C.

The conversion ratio of the reaction varies with type of the catalyst for isocyanuration. It is usually 8 to 50% by weight, preferably 9 to 45% by weight. Of course, the conversion ratio has to be kept within such range that the mononuclear compound is contained in an amount of at least 65% by weight.

After the reaction is over, the reaction mixture can readily be formed into the final isocyanurate-type polyisocyanate by deactivating the catalyst for isocyanuration with an acidic compound such as phosphoric acid, monochloroacetic acid or dodecylbenzenesulfonic acid and then removing the unreacted hexamethylene diisocyanate via molecular distillation.

The diisocyanate compound being used in obtaining the polyisocyanate (A) is, as aforesaid, hexamethylene diisocyanate. However, if especially required, an aliphatic or alicyclic diisocyanate compound such as tetramethylene diisocyanate, 1,3-bis(isocyanate methyl)cyclohexane or isophorone diisocyanate may be used in combination, provided it is preferable that the amount of the diisocyanate compound other than hexamethylene diisocyanate is usually limited to 35% by weight or less.

The isocyanurate-type polyisocyanate (A) has to contain at least 65% by weight (i.e. 65 to 100% by weight), preferable at least 70% by weight, more preferably 75 to 95% by weight of the mononuclear compound. Where the amount of the mononuclear compound is less than 65% by weight, compatibility with various acrylic polyols (B) goes poor, undesirably impairing performance of the coated film, as is the case with the prior art.

The acrylic polyol (B) having the number-average molecular weight of 5,000 to 25,000 and the hydroxyl value of 40 to 160 as the other essential component of the urethane coating resin composition in this invention is a copolymer obtained by radical-polymerizing ethylenically unsaturated bond-containing hydrocarbon derivatives (hereinafter abbreviated as "ethylenic hydrocarbon derivatives") properly selected from the group consisting of the following compounds represented by formulas [III] to [VI].

Compound represented by formula [III]

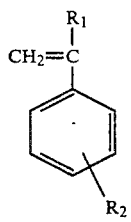

[III]

wherein $R_1$ and $R_2$ may be the same or different and each denotes a hydrogen atom or a monovalent hydrocarbon group with 1 to 12 carbon atoms which may contain an oxygen atom. (e.g. styrene, alpha-methylstyrene, p-methylstyrene, p-methoxystyrene or p-tertbutylstyrene) Compound represented by formula [IV]

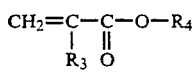

[IV]

wherein $R_3$ denotes a hydrogen atom or a monovalent hydrocarbon group with 1 to 6 carbon atoms, and $R_4$ denotes a monovalent hydrocarbon group with 1 to 12 carbon atoms which may contain an oxygen atom.
(e.g. methyl methacrylate, n-butyl methacrylate, isobutyl methacrylate, tert-butyl methacrylate, 2-ethylhexyl methacrylate, ethyl acrylate, n-butyl acrylate, 2-ethylhexyl acrylate or 2-ethoxyethyl acrylate) Compound represented by formula [V]

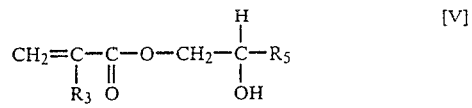

wherein $R_3$ is as defined above, and $R_5$ denotes a monovalent hydrocarbon group with 1 to 6 carbon atoms which may contain an oxygen atom.
(e.g. beta-hydroxyethyl methacrylate, betahydroxypropyl methacrylate or beta-hydroxyethyl acrylate) Compound represented by formula [VI]

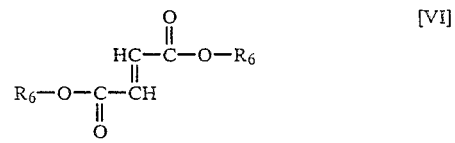

wherein $R_6$ denotes a monovalent hydrocarbon group with 1 to 12 carbon atoms.
(e.g. diethyl fumarate, di-n-butyl fumarate, di-iso-butyl fumarate or di-2-ethylhexyl fumarate)

Preferable copolymers are a copolymer of the compounds of formulas [III], [IV] and [V], a copolymer of the compounds of formulas [III], [V] and [VI], a copolymer polymer of the compounds of formulas [III], [IV], [V] and [VI], and a copolymer of the compounds of formulas [IV] and [V].

Ethylenic hydrocarbon derivatives not included in formulas [III] to [VI] may be used as an aid to produce the acrylic polyol. Typical examples thereof are carboxyl group-containing ethylenic hydrocarbons such as methacrylic acid, acrylic acid and itaconic acid, and oxirane ring-containing ethylenic hydrocarbons such as glycidyl methacrylate.

The acrylic polyol (B) may be prepared from the various ethylenic hydrocarbon derivatives by the usual radical polymerization reaction using a known radical initiator. Examples of the known, radical initiator are benzoyl peroxide, azobisisobutyronitrile, tert-butyl peroctoate, di-tert-butyl peroxide and tert-butyl perbenzoate.

Such radical polymerization reaction is usually performed at 60° to 150° C. in an organic solvent such as toluene, xylene or butyl acetate.

Among the aforesaid various ethylenic hydrocarbon derivatives, the acrylic polyol (B) including styrene or its derivatives represented by formula [III] is especially preferable in this invention because when combined with the aforesaid polyisocyanate (A), it gives the cured coated film having especially good mechanical properties.

On the contrary, an acrylic polyol that does not use said styrene or its derivatives forms a clear coated film immediately after coating when combined with the polyisocyanate (A), but with the lapse of time, the coated film tends to be gradually turbid.

Thus, a suitable amount of said styrene or its derivatives is usually 5 to 50% by weight based on the total weight of the ethylenically unsaturated hydrocarbon derivatives.

The acrylic polyol (B) is, as aforesaid, preferably an acrylic polyol having a number-average molecular weight of 5,000 to 25,000, more preferably an acrylic polyol having a number-average molecular weight of 5,500 to 20,000.

When the molecular weight of said polyol (B) is too low, a quick-drying coating can hardly be obtained. When it is too high, a high solid coating can hardly be obtained, and coatability is impaired. Neither case is thus desirous.

Meanwhile, the hydroxyl value of the polyol is preferably 40 to 160, more preferably 50 to 120, calculated as a resin solids content.

Where the hydroxyl value of the polyol is too low, a coated film of good performance can scarcely be formed. Where it is too high, the costly polyisocyanate (A) is used in a large amount, inviting an economical disadvantage. Neither case is thus desirous.

It is advisable that the glass transition point (Tg) of the acrylic polyol (B) is not so low for providing desirable drying characteristics, but this is not particularly limited. Usually, Tg is preferably 25° C. or higher, more preferably 30° C. or higher. By contrast, when Tg of the acrylic polyol (B) is too high, flexibility of the coated film tends to lose. Accordingly, Tg has to be maintained at 80° C. or lower, more preferably 70° C. or lower.

The acrylic polyol (B) may be, if particularly required, modified with polyesters including even an alkyd resin. On this occasion, it is advisable that a modification ratio is 30% by weight or less, preferably 15% by weight or less in order not to impair weatherability inherent in the acrylic polyol (B) itself.

To prepare a coating from the urethane coating resin composition of this invention comprising the isocyanurate-type polyisocyanate (A) and the acrylic polyol (B) as essential components, it is advisable to blend the essential components such that the isocyanate group and the hydroxyl group are equal equivalents, i.e. at an NCO/OH equivalent ratio of 1.0. As a result, a quick-drying coating with good performance can be formed. However, if particularly required, the polyisocyanate (A) and the acrylic polyol (B) may be blended at an NCO/OH equivalent ratio of 0.3 to 2.0, preferably 0.8 to 1.2.

The urethane coating resin composition of this invention can be used as such as a clear varnish or as an enamel coating containing various pigments such as titanium white, carbon black or Cyanine blue, or extender pigments.

The clear varnish or enamel coating as the composition of this invention is a two-package coating comprising the curing agent composed of the isocyanurate ring-containing polyisocyanate and the main agent composed of the acrylic polyol as essential components. In case of the enamel coating, the pigment is usually blended and kneaded with the main agent. A thinner needed to form the coating can be an ordinary thinner used in urethane coatings.

When the composition of this invention is used as a coating, celluloses such as cellulose acetate butyrate and nitrocellulose, and known additives such as a plasticizer, a leveling agent and a surface active agent may be conjointly used. A curing catalyst may also be used if particularly required.

When the two-package coating composed of the composition of this invention is put to practical use, the curing agent component and the main agent component are first blended, and the blend is then coated by usual means such as an air spray, an airless spray, an electrostatic coating device and a roll coater.

The room temperature curing coating has been thus far explained. If particularly required, a good coated film can be obtained even by a method wherein forced drying is carried out at a temperature of 40° to 100° C. and a cured coated film is formed for a quite short period of time.

The following Referential Examples, Examples and Comparative Examples illustrate this invention, but this invention is not particularly limited thereto.

In said Referential Examples, Examples and Comparative Examples, "%" is all "% by weight" unless otherwise indicated.

Referential Example 1: [Preparation example of a polyisocyanate (A)]

In a 5-liter four-necked glass flask equipped with a stirrer, a nitrogen gas introducing tube, a condenser and a thermometer was charged 3,500 g of hexamethylene diisocyanate (HDI) under an atmosphere of a nitrogen gas. With stirring, the temperature was raised to 55° C. in an oil bath, and a 20% butyl Cellosolve solution of N,N,N-trimethyl-N'-2'-hydroxypropylammonium-p-tert-butyl benzoate (molecular weight 295.4) represented by the above formula [II] was added to the flask as a catalyst for isocyanuration in divided portions. As a result, when the catalyst solution was added in a total amount of 5.2 g, the temperature inside the reaction vessel was elevated to 62° C.

After the heat generation was finished, the progress of the reaction was traced by refractive index while maintaining the temperature inside the reaction vessel at 60° C. When the refractive index ($n_D^{25}$) of the reaction mixture reached 1.4625, 5.2 g of a 6.8% xylylene solution of monochloroacetic acid (molecular weight 94.5) was added to the reaction vessel as a deactivator of the catalyst to stop the reaction.

Subsequently, the reaction mixture was cooled to room temperature and 1,000 g of the reaction mixture was subjected to molecular distillation. There were obtained 251.2 g (conversion ratio 25.2%) of a polyisocyanate as a distillation residue and 747.2 g of HDI (recovery ratio 74.8%) as a distillate.

This is designated a polyisocyanate (A-1).

The thus obtained polyisocyanate (A-1) was a pale yellow clear liquid having a Gardner viscosity at 25° C. of X-Y and an isocyanate content (hereinafter abbreviated as "NCO %") of 22.8%. Analysis of the polyisocyanate (A-1) by IR absorption spectrum and $^{13}$C nuclear magnetic resonance spectrum revealed that it was an isocyanurate-type polyisocyanate. According to high-speed gel permeation chromatography, the polyisocyanate (A-1) contained 67% of a so-called mononuclear compound of formula [I] wherein n is 1. The number-average molecular weight of the polyisocyanate (A-1) was measured and found to be 580.

Referential Example 2: [Preparation example of a polyisocyanate (A)]

The procedure in Referential Example 1 was repeated except that the isocyanuration reaction continued until the refractive index ($n_D^{25}$) reached 1.4610. When 1,000 g of the reaction mixture after the catalyst was deactivated and was subjected to molecular distillation, a final polyisocyanate was obtained at a conversion ratio of 20.8%. This is designated a polyisocyanate (A-2).

The thus obtained polyisocyanate (A-2) was a pale yellow clear liquid having a Gardner viscosity of V-W and NCO% of 23.2%, and confirmed to be an isocyanurate-type polyisocyanate. According to high-speed permeation chromatography, the polyisocyanate (A-2) contained 73% of a so-called mononuclear compound of formula [I] wherein n is 1.

Referential Example 3: [Preparation example of a polyisocyanate (A)]

The procedure in Referential Example 1 was repeated except that the isocyanuration reaction was carried out until the refractive index ($n_D{}^{25}$) reached 1.4547. The reaction mixture (1,000 g) after the catalyst was deactivated was subjected to molecular distillation to obtain a final polyisocyanate at a conversion ratio of 9.8%. This is designated a polyisocyanate (A-3).

The polyisocyanate (A-3) was a pale yellow clear liquid, and confirmed to be an isocyanurate-type polyisocyanate having a Gardner viscosity of U and NCO % of 24.0%. According to high-speed gel permeation chromatography, the polyisocyanate (A-3) contained 83% of a so-called mononuclear compound of formula [I] wherein n is 1. The number-average molecular weight was 505.

Referential Example 4: [Preparation example of a control polyisocyanate]

The procedure in Referential Example 1 was repeated except that the isocyanuration reaction was carried out until the refractive index ($n_D{}^{25}$) reached 1.4825. When 1,000 g of the reaction mixture after the catalyst was deactivated was subjected to molecular distillation, a final control polyisocyanate was obtained at a conversion ratio of 58.0%. This is called a polyisocyanate (A-1').

The polyisocyanate (A-1') was confirmed to be an isocyanurate-type polyisocyanate having a Gardner viscosity of $Z_5$-$Z_6$ and NCO % of 20.0%. According to high-speed gel permeation chromatography, the polyisocyanate (A-1') contained 38% of a mononuclear compound of formula [I] wherein n is 1. The number-average molecular weight was confirmed to be 755.

Referential Example 5: [Preparation example of an acrylic polyol (B)]

A three-liter four-necked flask equipped with a stirrer, a thermometer, a nitrogen gas introducing tube and a condenser was charged with 450.0 g of styrene, 64.6 g of methyl methacrylate, 255.4 g of ethyl acrylate and 230.0 g of beta-hydroxyethyl methacrylate together with 1,000 g of butyl acetate as a solvent. Radical polymerization was conducted at a temperature of 105° to 110° C. in an usual manner using tert-butyl peroxy-2-ethylhexanoate and tert-butyl peroxybenzoate as a radical initiator. As a result, a final acrylic polyol having a hydroxyl value of 98.0 and a number-average molecular weight of 16,400 was obtained as a solution having a solids content (hereinafter called a "nonvolatile content") of 50.1.

This is designated a polyol (B-1).

Referential Example 6: (Preparation example of an acrylic polyol [B])

The procedure in Referential Example 5 was repeated except that a mixture of 400.0 g of styrene, 120.0 g of methyl methacrylate, 250.0 g of di-n-butyl fumarate and 230.0 g of beta-hydroxyethyl methacrylate was used as an ethylenic hydrocarbon derivative. There was obtained a solution of a final acrylic polyol having a hydroxyl value of 102.3, a number-average molecular weight of 15,300 and a nonvolatile content of 50.5%. This is designated a polyol (B-2).

EXAMPLE 1

The polyisocyanate (A-1) obtained in Referential Example 1 and the polyol (B-1) obtained in Referential Example 5 were blended at an NCO/OH equivalent ratio of 1.0 using a solvent mixture of toluene/xylene/'Sorvesso 100"/butyl acetate/ethyl acetate/Cellosolve acetate = 40/20/10/10/10/10 (weight ratio: "Sorvesso 100" is a tradename for an aromatic hydrocarbon mixture made by Exxon K. K., U.S.) as a thinner to prepare a clear coating having a nonvolatile content of 50%.

Subsequently, the coating was coated onto a glass plate at room temperature. Consequently, even after a long period of time, a tough, clear cured coated film was obtained.

In order to avoid an influence of a temperature, the clear coating was coated onto an untreated polypropylene plate under an atmosphere of a nitrogen gas, and left to stand for 1 month under the atmosphere of the nitrogen gas to obtain a cured film.

For evaluating mechanical properties of the cured film, tensile properties were measured at a temperature of 60° C. and a pulling rate of 50 mm/min. There was obtained an initial modulus (0.5% modulus) of $45.3 \times 10^3$ kg/cm².

EXAMPLE 2

The procedure in Example 1 was followed except that the polyisocyanate (A-2) obtained in Referential Example 2 was used instead of the polyisocyanate (A-1). There resulted a clear coating and then a tough, clear cured coated film.

In the same way as in Example 1, the initial modulus of the room temperature-cured film obtained under the nitrogen gas atmosphere was measured and found to be $45.9 \times 10^3$ kg/cm².

EXAMPLE 3

The procedure in Example 1 was repeated except that the polyisocyanate (A-3) obtained in Referential Example 3 was used instead of the polyisocyanate (A-1). There resulted a tough, clear cured coated film and then a room temperature-cured film having an initial modulus of $47.2 \times 10^3$ kg/cm².

EXAMPLE 4

The procedure in Example 1 was repeated except that the polyol (B-2) obtained in Referential Example 6 was used instead of the polyol (B-1). Even after a long period of time, a clear, durable cured coated film was formed.

EXAMPLE 5

The procedure in Example 2 was repeated except that the polyol (B-2) obtained in Referential Example 6 was used instead of the polyol (B-1). Even after a long period of time, a clear, highly durable cured coated film was formed.

EXAMPLE 6

The procedure in Example 3 was repeated except that the polyol (B-2) obtained in Example 6 was used instead of the polyol (B-1). Even after a long period of time, a quite clear, durable cured coated film was formed.

COMPARATIVE EXAMPLE 1

The procedure in Example 1 was followed except that the polyisocyanate (A-1′) obtained in Referential Example 4 was used instead of the polyisocyanate (A-1). As a result, owing to poor compatibility, only an opaque coated film was formed. However, with the lapse of time, the subsequent reaction proceeded and clarity gradually increased. After a long period of time, an almost clear cured coated film was obtained.

An initial modulus was measured for a room temperature-cured film formed as in Example 1 and found to be as low as 37.1.

COMPARATIVE EXAMPLE 2

The procedure in Comparative Example 1 was followed except that the polyol (B-2) was used instead of the polyol (B-1). The coated film formed by using the coating immediately after blending was opaque and turbid. It was confirmed that the polyisocyanate (A-1′) was not compatible with the polyol (B-2).

From the foregoing Examples, it follows that this invention can provide the economically advantageous urethane coating resin composition that gives the coated film having good properties and excellent durability, simply by combining the specific isocyanurate-type polyisocyanate containing at least 65% by weight of the mononuclear compound as such with the acrylic polyol without the need of such complex step that part of isocyanate groups of the isocyanurate-type polyisocyanate having inherently good durability are modified by the reaction with diols, etc.

What is claimed is:

1. An urethane coating resin composition comprising as essential components (A) an isocyanurate-type polyisocyanate represented by formula:

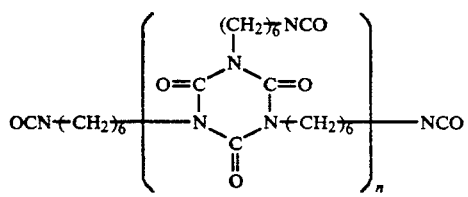

wherein n is an integer of 1 to 20, derived from hexamethylene diisocyanate and containing at least 65% by weight of a mononuclear compound and (B) an acrylic polyol having a number-average molecular weight of 5,000 to 25,000 and a hydroxyl value of 40 to 160.

2. The urethane coating resin composition of claim 1 wherein the polyisocyanate (A) is obtained by subjecting hexamethylene diisocyanate to an isocyanuration reaction in the presence of N,N,N-trimethyl-N′-2′-hydroxypropylammonium-p-tert-butyl benzoate represented by formula:

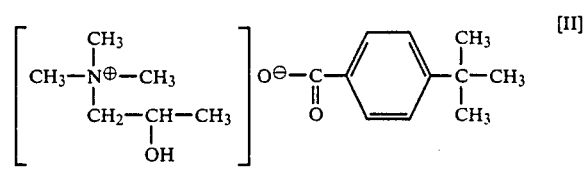

3. The urethane coating resin composition of claim 1 wherein the acrylic polyol (B) is a copolymer obtained by radical-polymerizing a monomer mixture comprising a compound represented by formula [III]

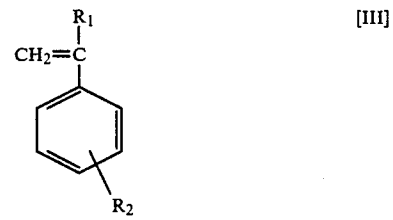

wherein $R_1$ and $R_2$ may be the same or different and each denotes a hydrogen atom or a monovalent hydrocarbon group with 1 to 12 carbon atoms which may contain an oxygen atom, a compound represented by formula [IV]

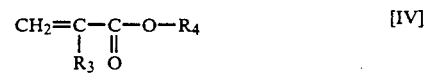

wherein $R_3$ denotes a hydrogen atom or a monovalent hydrocarbon group with 1 to 6 carbon atoms, and $R_4$ denotes a monovalent hydrocarbon group with 1 to 6 carbon atoms which may contain an oxygen atom, and a compound represented by formula [V]

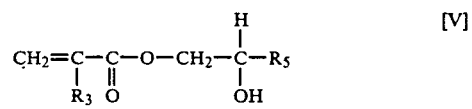

wherein $R_3$ is as defined above, and $R_5$ denotes a monovalent hydrocarbon group with 1 to 6 carbon atoms which may contain an oxygen atom.

4. The urethane coating resin composition of claim 1 wherein the acrylic polyol (B) is a copolymer obtained by radical-copolymerizing a monomer mixture comprising a compound represented by formula [III]

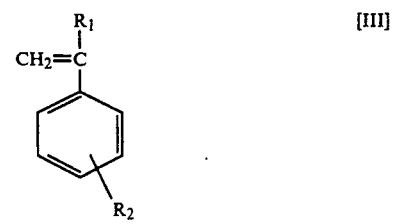

wherein $R_1$ and $R_2$ may be the same or different and each denotes a hydrogen atom or a monovalent hydrocarbon group with 1 to 12 carbon atoms which may contain an oxygen atom, a compound represented by formula [IV]

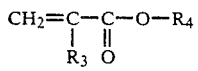

wherein $R_3$ denotes a hydrogen atom or a monovalent hydrocarbon group with 1 to 6 carbon atoms, and $R_4$ denotes a monovalent hydrocarbon group with 1 to 6 carbon atoms which may contain an oxygen atom, a compound represented by formula [V]

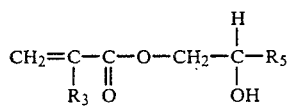

wherein $R_3$ is as defined above, and $R_5$ denotes a monovalent hydrocarbon group with 1 to 6 carbon atoms which may contain an oxygen atom, and a compound represented by formula [VI]

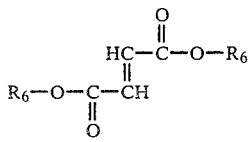

wherein $R_6$ denotes a monovalent hydrocarbon group with 1 to 12 carbon atoms.

5. The urethane coating resin composition of claim 1, wherein the isocyanurate-type polyisocyanate contains at least 70% by weight of mononuclear compound.

6. The urethane coating resin composition of claim 1, wherein the isocyanurate-type polyisocyanate contains from 75 to 95% by weight of mononuclear compound.

7. The urethane coating resin composition of claim 1, wherein the acrylic polyol has a number average molecular weight of 5,500 to 20,000 and an hydroxyl value of from 50 to 120.

8. The urethane coating resin composition of claim 1, wherein the acrylic polyol has a glass transition temperature of from 25° C. to 80° C.

9. The urethane coating resin composition of claim 1, wherein the acrylic polyol comprises from about 5 to 50% by weight of styrene, alpha-methylstyrene, p-methylstyrene, p-methoxystyrene or p-tert-butylstyrene.

10. The urethane coating resin composition of claim 1, wherein the ratio of the isocyanurate-type polyisocyanate (A) to the acrylic polyol is such that the NCO-/OH equivalent ratio is from 0.3 to 2.0.

11. The urethane coating resin composition of claim 1, wherein the ratio of the isocyanurate-type polyisocyanate (A) to the acrylic polyol is such that the NCO-/OH equivalent ratio is from 0.8 to 1.2.

12. The urethane coating resin composition of claim 1, wherein the ratio of the isocyanurate-type polyisocyanate (A) to the acrylic polyol is such that the NCO-/OH equivalent ratio is about 1.0.

* * * * *